J. F. BIRCH, Jr.
FISH CLEANING MACHINE.
APPLICATION FILED MAY 28, 1918.

1,326,905.

Patented Jan. 6, 1920.
3 SHEETS—SHEET 1.

Inventor
J. F. Birch, Jr.

By A. M. Wilson
Attorney

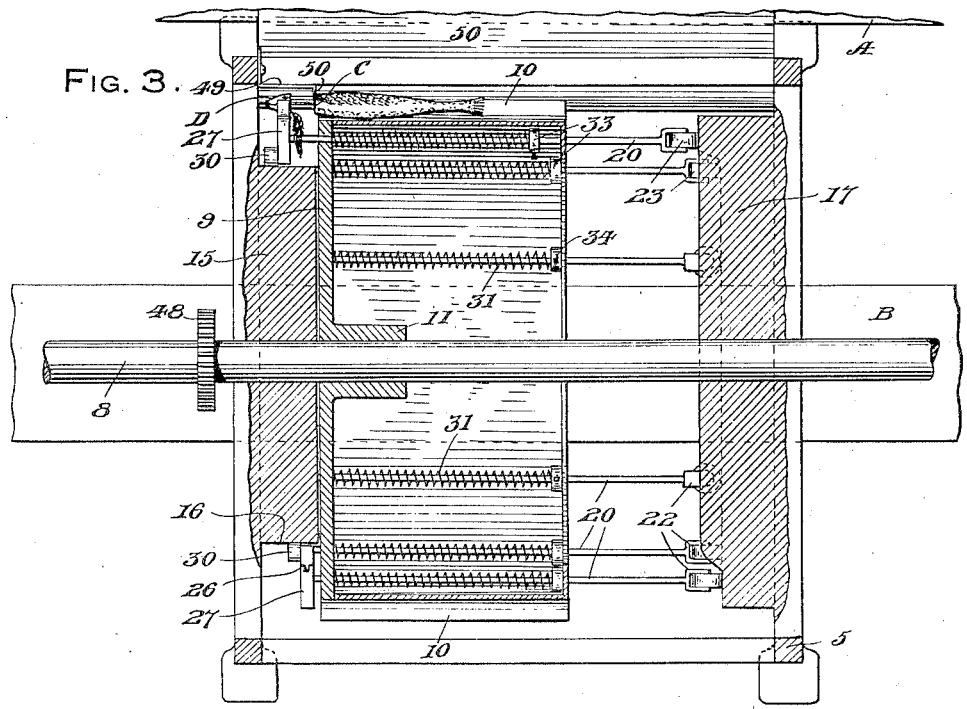
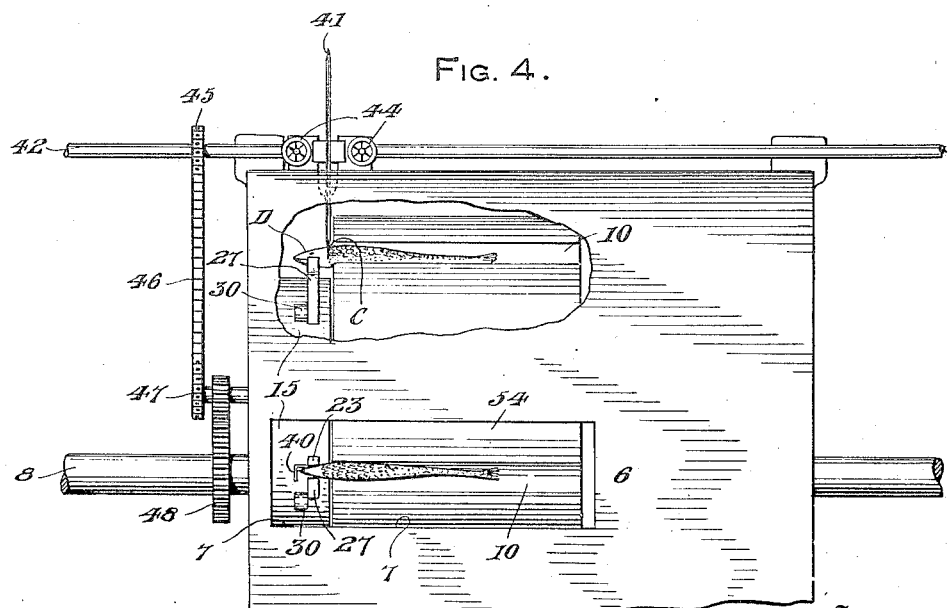

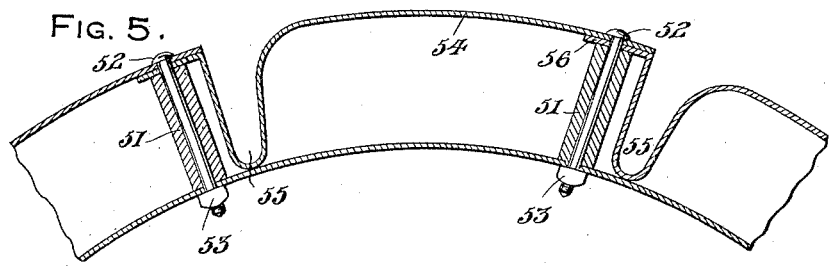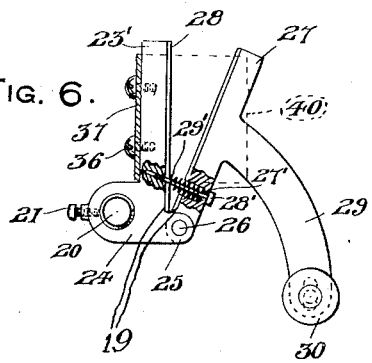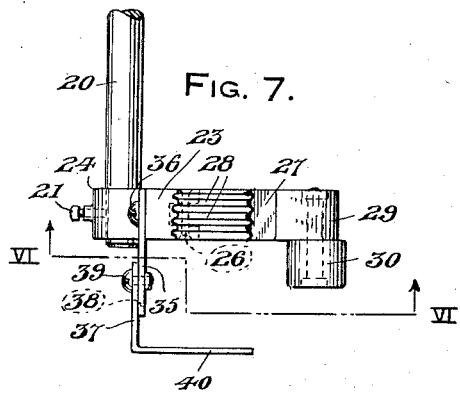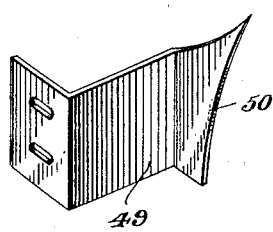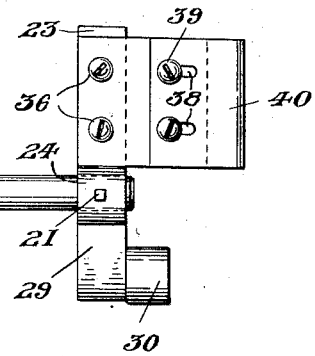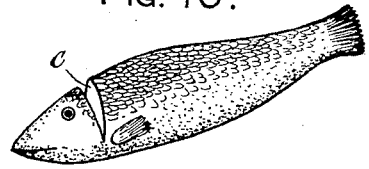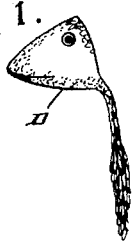

UNITED STATES PATENT OFFICE.

JOSEPH F. BIRCH, JR., OF BALTIMORE, MARYLAND, ASSIGNOR, BY DIRECT AND MESNE ASSIGNMENTS, TO MUSHER AND COMPANY, INC., OF BALTIMORE, MARYLAND, A CORPORATION OF DELAWARE.

FISH-CLEANING MACHINE.

1,326,905.  Specification of Letters Patent.  Patented Jan. 6, 1920.

Application filed May 28, 1918. Serial No. 237,064.

*To all whom it may concern:*

Be it known that I, JOSEPH F. BIRCH, Jr., a citizen of the United States of America, residing at Baltimore, in the county of Baltimore City and State of Maryland, have invented certain new and useful Improvements in Fish-Cleaning Machines, of which the following is a specification.

My invention relates to a machine capable of eviscerating any kind of fish of uniform size and is also constructed so that by varying the proportions of certain of the machine working parts, it is capable of eviscerating different size fish in a quick and efficient manner, the machine being particularly adapted for fish utilized for canning purposes.

The primary object of this invention is the provision of a machine having a rotating drum provided with pockets in which the fish are arranged, the drum being arranged in spaced relation to a knife so that the head of the fish may be partially severed from the body and upon further movement of the drum the head removed from the body and drawing the entrails of the fish therefrom.

A further object of the invention is the provision of a novel clamp slidably associated with the drum for holding the fish in position for receiving the knife to permit the head to be partially severed from the body and means coöperating with these clamps whereby they may be shifted laterally removing the viscera entirely from the body.

A further object of the invention is the provision of a machine for eviscerating fish having a rotating shaft upon which is mounted a drum, cam rings located on opposite sides of the drum and the cam surfaces of the rings being at right angles to each other, and means operating upon the cam surfaces whereby the fish is held in cutting position and upon further operation of the machine the head and viscera of the fish may be removed.

With these general objects in view and others that will appear as the nature of the invention is better understood, the same consists in the novel construction, combination and arrangement of parts hereinafter more fully described, illustrated in the accompanying drawings, and then claimed.

Figure 1:
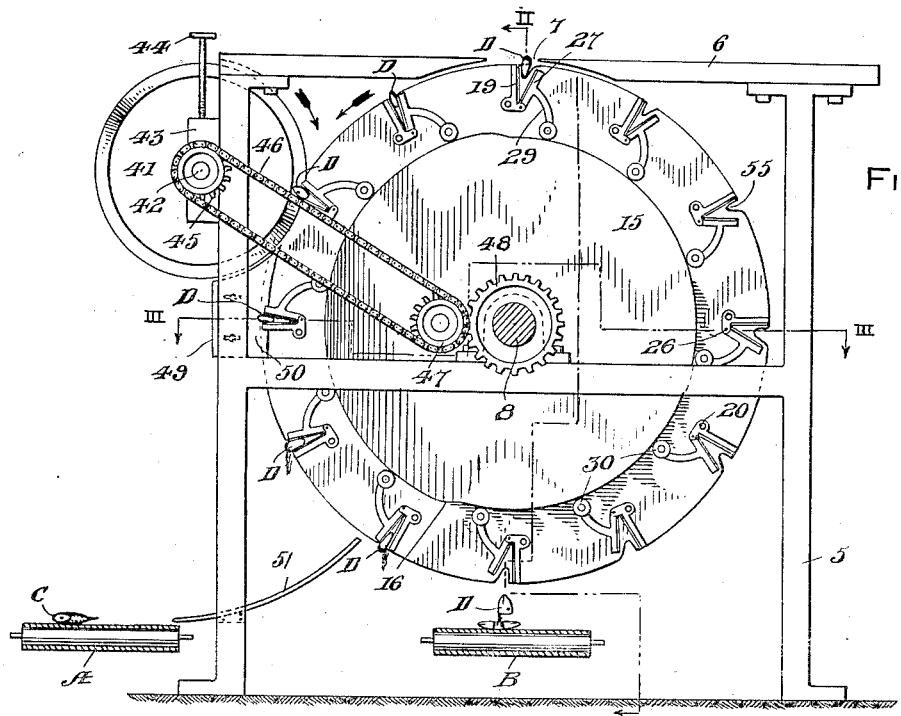
Figure 2:
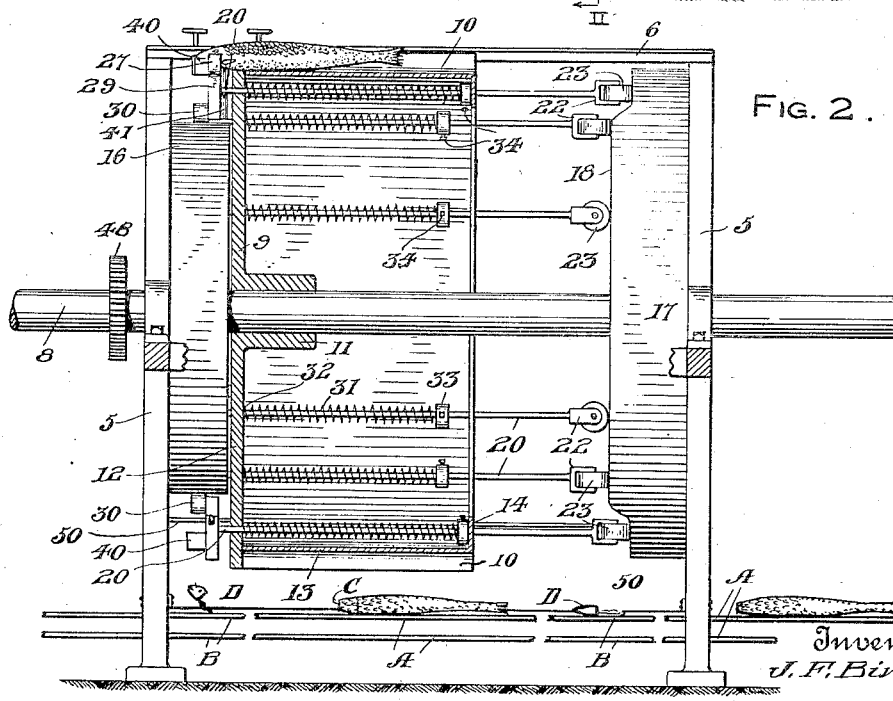

In the drawings forming a part of this application, and in which like reference characters refer to corresponding parts throughout the several views, Figure 1 is a side elevation of the machine as made in accordance with this invention with the conveying belts in section, Fig. 2 is a vertical sectional view taken on line II—II of Fig. 1, Fig. 3 is a transverse sectional view taken on line III—III of Fig. 1, Fig. 4 is a top plan view partly broken away to illustrate the location of fish when in active knife engaging position, Fig. 5 is a modification of the manner in which the fish-holding drum may be constructed, Fig. 6 is a sectional view taken on the line VI—VI of Fig. 7, Fig. 7 is a top plan view of a fish clamp with the gage in position, Fig. 8 is a side elevation of the fish clamp and gage, Fig. 9 is a perspective view of the retaining plate, Fig. 10 is a view of the fish with its head partially severed from its body and Fig. 11 is a view of the fish head and viscera.

Referring to the drawings the numeral 5 indicates a supporting frame including spaced vertical standards connected by horizontal braces. The upper ends of the standards have secured thereto a suitable table 6 which is provided with a transverse opening 7.

A driving shaft 8 is journaled in the frame 5 below the table top and in alinement with the longitudinal axis of the opening 7 of the table top. This shaft is adapted to be driven by any suitable gearing suitable for the purpose and it has secured thereto for rotation therewith a drum 9, which drum is provided in its periphery with a plurality of spaced fish-receiving pockets 10 which extend transversely across the periphery of the drum. These pockets are adapted to receive the fish belly-down when fed from the upper surface of the top 6 through the opening 7, it being illustrated in Fig. 4 of the drawings that the pockets 10 aline with this opening upon the rotation of the drum by the shaft 8.

The drum is of hollow construction and has a hub 11 carrying at one end the flange 12 and to the periphery of this flange is connected the band 13 having its front edge bent downwardly to provide an annular ring 14. The band 13 constitutes the periphery of the drum in which the pockets 10 are formed. A ring 15 is secured to the frame 5 in spaced relation to the flange 12 of the drum and the periphery of this ring is provided with a suitable cam surface 16, the use of which will appear as the description proceeds. A second ring 17 is secured to the frame in spaced relation to the flange 14 of the drum and the inner face of this ring is provided with a cam surface 18, the purpose of this face will also be hereinafter more fully described.

A plurality of clamps 19 as shown in Fig. 6 are secured in alinement with each pocket 10 of the drum. Said clamps being secured to one end of the transverse rods 20 by suitable set screw 21, and these rods extend transversely through the drum and have secured to their free ends suitable yokes 22 in which are journaled rollers 23, which bear against the cam surface 18 of the ring 17. It will be understood that the clamps are located against the outer surface of the flange 12 of the drum and each clamp being in alinement with its respective pocket 10. The clamps comprise a relatively stationary jaw 23' which jaw has an enlargement 24 formed on its lower end in which the shaft 26 is secured. Formed from the free end of this enlargement 24 is a lug 25 to which is pivotally secured as at 26 the relatively movable jaw 27. The opposing faces of these jaws are provided with suitable vertical corrugations 28 which permit the jaw to grasp the head of the fish and hold the same tightly therein.

The movable jaw is provided near its pivot with a transverse opening which has an increasing diameter to form an interior shoulder 27'. A bolt 28' is loosely fitted in said opening and has its inner end threaded in the stationary jaw 23. A coil spring 29' surrounds the shank of the bolt and has one end abutting the interior shoulder and its opposite end abutting the gripping face of the jaw 23 thus when the jaw 27 is moved in the direction of the jaw 23 the spring is placed automatically under compression and when the jaw 27 is released it will be automatically returned to open position.

An arm 29 is formed from the outer vertical edge of the relatively movable jaw 27 and this arm is substantially arcuate and has journaled to its lower end a roller 30 which is movable over the cam surfaces 16 of the ring 15 to cause the relatively movable jaw to move toward and away from the stationary jaw thereby causing the clamping and releasing of the fish heads upon the revolving of the drum.

It will be understood that the rings 15 and 17 respectively, are stationary and that their cam surfaces are arranged so that the operation of the clamping and releasing of the fish-head will be accomplished at such intervals from which the best results may be obtained.

The rods 20 which extend transversely through the drum from each clamp 19 have positioned thereon a coiled spring 31 one end of which spring of each rod is secured to the inner side of the flange 12 as at 32 and the opposite end of the springs are engaged by stop-collars 33, each stop-collar being mounted on its respective shaft and adjustably held thereon through the instrumentality of the set screw 34.

To assure of the proper cut of each fish there is provided a sectional gage having a relatively stationary section 35 which is secured by suitable fastening means 36 to the relatively stationary jaw of the clamps and at right angles thereto. The movable section or adjustable section 37 of this gage is provided with slots 38 which permits this section to be adjustably secured by the fastening means 39 to the free end of the section 35.

The forward end of the relatively movable section of the gage is bent parallel with the jaws 23 and 27 respectively to form the stop 40 which engages the fish-head to limit its movement after being positioned in the pocket of the drum. It will be readily seen that by this gage the fish are so located in the pockets that the proper cut may be made without fear of injuring that part of the fish which is to be used.

A rotary cutter 41 is mounted upon a shaft 42 which is journaled in the blocks 43 secured to the frame 5. The peripheral cutting edge of this rotary cutter is located in a position relative to the clamps 19 of the drum so that the fish-head may be partially severed from the body as illustrated in Fig. 10 of the drawings.

The blocks 43 are provided with suitable vertical screws 44 whereby the rotating disk or cutter may be adjusted with relation to the drum to compensate for various sized fish.

The shaft 42 upon which the cutter is mounted is provided with a suitable sprocket wheel 45 over which is trained a sprocket chain 46 the chain also being trained over a sprocket wheel 47 driven by a gear 48 which is mounted on the main drive shaft 8 of the frame. The rotation of the rotary cutter is in a direction opposite to the rotation of the drum as indicated by arrows in Fig. 1 of the drawings.

A retaining plate 49 is secured to one of the vertical uprights of the frame 5 and is positioned beneath the rotary cutter 41. This plate is provided with an angular hand 50 and its relation to the cutting disk or cutter 41 is such that it will engage the butt end of the fish, from which the head has been partially severed by the cutting disk thus preventing the body of the fish from moving from its pocket until the drum has moved to such a position well beyond the rotary cutter. The hand portion 50 of the retaining plate moves into the cut in the fish made by the rotary cutter 41 as soon as it leaves the cutter and serves to hold the fish against movement from its pocket during the evisceration action by the clamps.

A suitable chute 51 is secured to the frame and has its upper end located directly under the retainer plate 49 and its opposite end located directly over a suitable conveyer belt A upon which the body of the fish is adapted to be deposited.

Another conveyer belt B is located within the frame and in alinement with the longitudinal axis of the drum and this conveyer belt is adapted to receive the heads of the fish released from the jaws of the clamps by the rollers of the jaws moving from the cam surfaces 16 of the ring 15.

It will be apparent that in the operation and use of the machine that the knife or cutter 41 is adjusted with relation to the drum through the instrumentality of the blocks and screws 43 and 44 respectively. The fish are delivered upon the table top 6 and fed into the pockets of the drum belly-down by the operator.

The rotation of the drum causes the rollers 30 of the movable jaw 27 of the clamp to move in the direction of the stationary jaw 23 against the tension of the spring 29' thus tightly grasping the fish-head. Upon further movement of the drum the fish is moved in the direction of the rotating cutter disk or cutter 41. The head is partially severed from the body as indicated in Fig. 10 by the character C. The continuous rotation of the drum moves the fish beyond the cutter and the angular hand 50 of the retaining plate moves into the cut made by the cutter 41 holding the body against longitudinal movement in the pocket of the drum. Upon further movement of the drum the fish body is deposited on the chute 50' and from there to the conveyer A. During this operation of the drum and prior to the fish passing beyond the retaining plate the rollers 23 at the inner ends of the rods 20 move up on the cam surfaces 18 of the ring 17 thus bodily moves the rods and then clamps 19 laterally of the drum and removes the head D and viscera of the fish from its body. The head and viscera of the fish are held by the clamp until the roller 30 leaves the cam surfaces 16° as illustrated in Fig. 1 and immediately upon the leaving of the cam surfaces 16 the jaw 27 moves away from the jaw 23 by the action of the spring 29', releasing the head and viscera of the fish which fall upon the conveying belt B.

It will be understood that the springs 31 serve to normally return the clamps back to their initial position with relation to the drum.

When the machines of this type are set up they are arranged in a series and are driven from a main drive shaft and each machine of the series is connected with this main drive shaft so that each operator of each machine may speed her machine to suit her convenience.

In the modification shown in Fig. 5 of the drawings the drum has arranged on its periphery a plurality of spaced radially extending blocks 51 which are held thereto by the bolts 52 which extend vertically therethrough and have secured to their inner ends the nuts 53. The pockets are formed in this drum by the strips 54 which have one end secured to their upper ends of the blocks 51 by the bolts 52 and their opposite ends disposed to form the pockets 55, the free end of the pockets being extended laterally as at 56 and secured to the adjacent block 51 by its bolt 52, it being understood that the free end of each strip 54 overlies the meeting ends 56 of the adjacent strip.

What I claim as new is:—

1. An apparatus of the class described comprising a frame, a rotating drum mounted in the frame and having a plurality of pockets, means to clamp a fish in the pockets of said drum, means to partially sever the head from the fish and means carried by the fish clamping means and operated by the movement of the drum to eviscerate the fish.

2. An apparatus of the class described comprising a frame, a drum rotatably mounted in the frame, a feeding table supported above said drum, fish-clamping means carried by the drum, means to partially sever the heads from the fish carried by said frame and means actuating the clamping means to remove the heads and viscera from the fish.

3. An apparatus of the class described comprising a frame, a drum having a plurality of spaced pockets in its periphery rotatably mounted in the frame, a table supported above said drum, a fish-cutting means supported by said frame, means for driving the drum and fish-cutting means, fish-clamping means carried by said drum, and means to move said fish-clamping means laterally of the drum for eviscerating a fish after movement beyond the cutting means as and for the purpose set forth.

4. A machine of the class described comprising a frame, a drum mounted in said frame, means for rotating said drum, clamps carried by said drum and having gripping jaws, means for moving the jaws into active gripping position upon movement of said drum, a rotating cutter supported by said frame, and means for shifting the clamps laterally of said drum when beyond said cutter for the purpose specified.

5. A machine of the class described comprising a frame, a drum mounted in said frame, means for rotating said drum, clamps carried by said drum and having gripping jaws, means for moving the jaws into active gripping position upon the movement of said drum, a cutter supported by said frame, means for shifting each clamp laterally of said drum when beyond said cutter, and means for returning the clamps to their initial position upon further movement of said drum for the purpose specified.

6. A machine of the class described, comprising a frame, a drum mounted in said frame, means for rotating said drum, clamps carried by said drum and having gripping jaws, means for moving the jaws into active gripping position upon the movement of said drum, a cutter supported by said frame, means for shifting each clamp laterally of said drum when beyond said cutter, means for returning said jaws to their normal position and further means for causing the jaws to open after they have returned to their initial position.

7. A machine of the class described, comprising a frame, a feeding table supported by said frame, a drum mounted in said frame beneath said table, a cutter supported by said frame, in spaced relation to one side of said drum, clamps carried by said drum, means for shifting said clamps laterally of said drum, when they pass beyond the cutter, means for returning the clamps to their initial position with relation to the drum and a chute carried by said frame to one side of said drum and positioned beneath said cutter for the purpose specified.

8. A fish-cutting and eviscerating machine comprising a frame, a table secured to said frame, a drum having spaced pockets mounted in said frame beneath said table, means for rotating said drum, rods transversely slidable in said drum, gripping jaws secured to one end of each rod and abutting the adjacent side of said drum, rollers journaled to the free ends of each rod, means for moving said jaws into active gripping position, means engaging the rollers of the rods for moving said rods and thus laterally of said drum and spring means for returning said rods and jaws to their initial positions.

9. A machine of the class described comprising a frame, a table supported by the frame, a drum rotatably mounted in the frame beneath said table, a rotary cutter adjustably supported by said frame in spaced relation to the drum, rods transversely slidable in said drum, a relatively stationary jaw secured to one end of each rod and abutting one side of the drum, a relatively movable jaw pivoted to each stationary jaw, a roller carried by each movable jaw, means secured to the frame for engaging the movable jaw rollers for moving the latter in the direction of the stationary jaw, means carried by the free ends of the rods for causing the lateral shifting of said rods upon the rotation of said drum and a gage carried by each stationary jaw for the purpose specified.

10. A machine of the class described comprising a frame, a drum rotatably mounted in the frame, a feeding table secured to the frame above said drum, a rotary cutter mounted in said frame, adjacent said drum, a retaining plate secured to said frame, beneath said cutter, and in spaced relation to one side of said drum, rods transversely slidable in said drum and arranged at a spaced distance apart, gripping jaws carried by one end of each rod, means secured to the frame for moving said jaws into active gripping position upon the rotation of the drum, rollers carried by the free ends of the rod and means secured to said frame for engagement with said rollers for shifting said rods and jaws laterally of the drum, a gage carried by each jaw and spring means surrounding the rods for returning the jaws and rods to their initial position.

11. A machine of the class described comprising a frame, a drum rotatably mounted in said frame, and having a plurality of spaced transversely arranged pockets in its periphery, jaws laterally shiftably mounted in said drum, means for shifting said jaws, an adjustable gage carried by each jaw, a rotary cutter secured to said frame, in spaced relation to one side of said drum and a retaining plate secured to said frame, beneath said cutter, to normally close one end of each pocket of said drum, and spring means for returning the jaws to their initial positions with relation to the drum.

12. A machine of the class described comprising a frame, a drum mounted in said frame, means for rotating the drum, a cutter mounted in said frame, means for rotating the said cutter in a direction opposite to said drum, spaced laterally shiftable rods mounted in said drum, a pair of jaws carried by one end of each rod and abutting one side of the drum, means for shifting the jaws and rods laterally of said drum, means for returning said rods and jaws to their initial positions with relation to the drum and conveying means associated with said drum for the purpose specified.

13. A fish eviscerating apparatus comprising a drum mounted for rotation and having fish receiving pockets in its periphery, means for clamping the fish in said pockets, a cutter for partially severing the heads from the fish, means for removing the head and viscera from said fish while clamped, and means for releasing said clamps from said fish.

14. A fish eviscerating apparatus comprising a drum mounted for rotation and having fish receiving pockets in the periphery thereof, clamping means for the fish in said pockets, a cutter for partially severing the head of the fish while clamped, a retainer for entering the cut made by the cutter to hold the fish in the pocket, and means for removing the head and viscera from the fish while clamped.

15. A fish eviscerating apparatus comprising a movable fish carrying member, means for clamping the fish in said member, a cutter for partially severing the heads from the fish, means for removing the head and viscera from said fish while clamped, and means for releasing said clamping means.

In testimony whereof I affix my signature.

JOSEPH F. BIRCH, Jr.